(12) United States Patent
Chan et al.

(10) Patent No.: US 7,378,969 B2
(45) Date of Patent: May 27, 2008

(54) SYSTEMS AND METHODS FOR VISUALIZING AUTO-ID DATA

(75) Inventors: Melissa A Chan, Fremont, CA (US); Tao Lin, Palo Alto, CA (US)

(73) Assignee: SAP AG, Walldorf (DE)

( * ) Notice: Subject to any disclaimer, the term of this patent is extended or adjusted under 35 U.S.C. 154(b) by 224 days.

(21) Appl. No.: 11/257,819

(22) Filed: Oct. 25, 2005

(65) Prior Publication Data
US 2007/0090951 A1  Apr. 26, 2007

(51) Int. Cl.
G08B 13/14 (2006.01)
(52) U.S. Cl. .............. 340/572.4; 340/572.1; 340/539.13
(58) Field of Classification Search ........... 340/572.1, 340/572.3, 572.4, 568.1, 539.13, 539.16, 340/539.2, 539.32; 700/1, 115; 709/221, 709/223; 235/435
See application file for complete search history.

(56) References Cited

U.S. PATENT DOCUMENTS

| | | | |
|---|---|---|---|
| 5,590,250 A | | 12/1996 | Lamping et al. |
| 6,057,843 A | | 5/2000 | Van Overveld et al. |
| 6,429,868 B1 | | 8/2002 | Dehner et al. |
| 6,496,832 B2 | | 12/2002 | Chi et al. |
| 6,583,794 B1 | | 6/2003 | Wattenberg |
| 6,941,184 B2 | * | 9/2005 | Ebert .................. 700/115 |
| 7,128,265 B2 | * | 10/2006 | Silverbrook et al. ... 235/462.08 |
| 7,155,676 B2 | * | 12/2006 | Land et al. .................. 715/731 |
| 7,185,075 B1 | * | 2/2007 | Mishra et al. .............. 709/223 |
| 2001/0049695 A1 | | 12/2001 | Chi et al. |
| 2002/0147763 A1 | | 10/2002 | Lee et al. |
| 2003/0158846 A1 | | 8/2003 | Ikehata et al. |
| 2004/0168115 A1 | | 8/2004 | Bauernschmidt et al. |
| 2004/0177068 A1 | | 9/2004 | Beretich et al. |
| 2004/0202370 A1 | | 10/2004 | Fisher et al. |
| 2004/0205535 A1 | | 10/2004 | Newman et al. |
| 2004/0205536 A1 | | 10/2004 | Newman et al. |
| 2004/0212615 A1 | | 10/2004 | Uthe |
| 2004/0220947 A1 | | 11/2004 | Aman et al. |
| 2004/0263513 A1 | | 12/2004 | Smith et al. |
| 2005/0039123 A1 | | 2/2005 | Kuchinsky et al. |
| 2005/0060277 A1 | | 3/2005 | Zlatanov et al. |

(Continued)

OTHER PUBLICATIONS

B.B. Bederson et al, "Ordered and Quantum Treempas: Making Effective Use of 2D Space to Display Hierarchies", Oct. 2002, pp. 833-854.

(Continued)

*Primary Examiner*—Van T. Trieu
(74) *Attorney, Agent, or Firm*—Fountainhead Law Group P.C.; Chad R. Walsh

(57) ABSTRACT

Embodiments of the present invention improve visualization of information associated with auto-ids (tag IDs). In one embodiment, the present invention includes a method of processing auto-identification data comprising storing a plurality of tag identifications, storing a plurality of locations, wherein each tag identification is associated with at least one location, storing information having a plurality of attributes, wherein each tag identification is associated with one or more of said attributes, generating a hierarchy based on at least one location or at least one attribute associated with the plurality of tag identifications, and displaying at least a portion of the information and at least a portion of the locations associated with each tag identification as nested shapes corresponding to the hierarchy.

25 Claims, 15 Drawing Sheets

U.S. PATENT DOCUMENTS

2005/0131882 A1    6/2005   Beretich et al.

OTHER PUBLICATIONS

David Shuping et al, "Geo-Temporal Visualization of RFID-Part 1", Directions Magazine, Sep. 7, 2005.

David Shuping et al, "Geo-Temporal Visualization of RFID-Part 2", Location Intelligence Conference 2007, Sep. 29, 2005.

Tao Lin, "Visualizing Relationships for Real World Applications", In the Proceedings of ACM Information Visualization and Manipulation Workshop 1998, 1998.

Tao Lin et al, "FEPSS: A Flexible and Extensible Program Comprehension Support System", In the Proceeding of IEEE 5th Working Conference on Reverse Engineering 1998, 1998.

Tao Lin et al, "Exploration of Data from Modeling and Simulation Through Visualization", In the Proceedings of International SimTecT Conference 1998, pp. 303-308.

Dr. Tao Lin, "Visualization for Auto-ID/RFID Initiative," 2004, pp. 1-27.

Brian Johnson et al., "6.3 Treemaps: a space-filling approach to the visualization of hierarchical information structures," 2nd Int'l IEEE Visualization Conference, See Below. Oct. 1991, pp. 275-291.

* cited by examiner

Available

In Maintenance

In Use 1.4GHz
1GHz
600 MHz
650 MHz
700 MHz
750 MHz
800 MHz

SYSTEMS AND METHODS FOR VISUALIZING AUTO-ID DATA

BACKGROUND

The present invention relates to processing automatic identification data, and in particular, to systems and methods for visualizing automatic identification data.

Auto-identification (auto-id) systems are used, for example, to identify or otherwise obtain information about products that are to be manufactured, bought or sold, transported, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical object by accessing the identifier, and thereby use information stored in a computer system corresponding to the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna coupled to an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many types of auto-id system devices exist. Examples include 2D bar code scanners, smart card devices/readers, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

However, one problem with auto-id systems is that a potentially vast amount of information may be acquired. For example, a very large number of readers may access auto-ids from an even larger number of identifiers. Moreover, each identifier may have associated information about the particular objects they are attached to. To compound this problem, the data associated with each identifier may change over time. Thus, large data sets may grow even larger as time passes. While such a large data set may contain useful information for performing a wide variety of tasks, it is difficult to present such a large volume of data to a user in a meaningful way. Therefore, it would be advantageous to develop techniques for displaying and visualizing auto-id data.

Thus, there is a need for improved auto-id data display and visualization. The present invention solves these and other problems by providing systems and methods for visualizing auto-id data.

SUMMARY

Embodiments of the present invention improve visualization of auto-id data. In one embodiment the present invention includes a method of processing auto-identification data comprising storing a plurality of tag identifications, storing a plurality of locations, wherein each tag identification is associated with at least one location, storing information having a plurality of attributes, wherein each tag identification is associated with one or more of said attributes, generating a hierarchy based on at least one location or at least one attribute associated with the plurality of tag identifications, and displaying at least a portion of the information and at least a portion of the locations associated with each tag identification as nested shapes corresponding to the hierarchy.

In one embodiment, a plurality of the nested shapes in a first hierarchical level correspond to locations, and wherein at least one shape nested within at least one location corresponds to an object having an attached tag identification.

In one embodiment, the stored information includes a plurality of time stamps, and wherein said object is displayed in multiple locations in the first hierarchical level to illustrate movement of the object over time.

In one embodiment, a lowest hierarchical level of nested shapes includes a fill according to at least one of said attributes.

In one embodiment, the fill comprises different colors, patterns, or shades to distinguish between different values of the at least one attribute.

In one embodiment, the fill corresponds to asset utilization in a location.

In one embodiment, the method further comprises filtering or aggregating the information.

In one embodiment, the method further comprises storing a plurality of time stamps, and displaying a time slider to allow a user to view changes in location or attribute values at different times.

In one embodiment, the hierarchy comprises a plurality of locations.

In one embodiment, the hierarchy comprises a plurality of properties of a plurality of objects associated with the stored tag identifications.

In another embodiment, the present invention includes a method of processing auto-identification data comprising receiving a plurality tag identifications, receiving a plurality of location identifiers, wherein each tag identification is associated with at least one location identifier, associating a location with information about an object using at least one of the tag identifications and associated at least one location identifier, wherein the information includes a plurality of attributes, generating a hierarchy based on at least one location or at least one attribute, and displaying at least a portion of the information and the location as nested shapes corresponding to the hierarchy.

In one embodiment, a nested shape is associated with a weight that determines the size of the nested shape.

In one embodiment, the weight is calculated based on at least one attribute associated with a tag identification.

In one embodiment, the hierarchy comprising a plurality of hierarchically related locations or hierarchically related attributes.

In one embodiment, a plurality of the nested shapes in a first hierarchical level correspond to locations, and wherein at least one shape nested within at least one location corresponds to an object having an attached tag identification.

In another embodiment, the present invention includes a computer-readable medium containing instructions for controlling a computer system to perform a method of processing auto-identification data comprising storing a plurality of tag identifications, storing a plurality of locations, wherein each tag identification is associated with at least one location, storing information having a plurality of attributes, wherein each tag identification is associated with one or more of said attributes, and displaying at least a portion of the information and at least a portion of the locations as a treemap.

In one embodiment, the treemap includes a plurality of the nested shapes in a first hierarchical level correspond to locations, and wherein at least one shape nested within at least one location corresponds to an object having an attached tag identification.

In one embodiment, the method further comprises storing a plurality of time stamps, and displaying a time slider to allow a user to view changes in location or attribute values at different times.

In one embodiment, the treemap includes a fill according to at least one of said attributes.

In one embodiment, the treemap includes a plurality of nested shapes having associated weights that determine the size of the nested shape.

Embodiments of the present invention improve visualization of auto-id data. In one embodiment the present invention includes a method of processing auto-identification data comprising storing a plurality of tag identifications, storing a plurality of locations, wherein each tag identification is associated with at least one location, storing information having a plurality of attributes, wherein each tag identification is associated with one or more of said attributes, generating a hierarchy based on at least one location or at least one attribute associated with the plurality of tag identifications, and displaying at least a portion of the information and at least a portion of the locations associated with each tag identification as nested shapes corresponding to the hierarchy.

In one embodiment, a plurality of the nested shapes in a first hierarchical level correspond to locations, and wherein at least one shape nested within at least one location corresponds to an object having an attached tag identification.

In one embodiment, the stored information includes a plurality of time stamps, and wherein said object is displayed in multiple locations in the first hierarchical level to illustrate movement of the object over time.

In one embodiment, a lowest hierarchical level of nested shapes includes a fill according to at least one of said attributes.

In one embodiment, the fill comprises different colors, patterns, or shades to distinguish between different values of the at least one attribute.

In one embodiment, the fill corresponds to asset utilization in a location.

In one embodiment, the hierarchy and the fill are specified by a user.

In one embodiment, the method further comprises storing a plurality of time stamps, and displaying a time slider to allow a user to view changes in location or attribute values at different times.

In one embodiment, the hierarchy comprises a plurality of locations.

In one embodiment, the hierarchy comprises a plurality of properties of a plurality of objects associated with the stored tag identifications.

In another embodiment, the present invention includes a method of processing auto-identification data comprising receiving a plurality tag identifications, receiving a plurality of location identifiers, wherein each tag identification is associated with at least one location identifier, associating a location with information about an object using at least one of the tag identifications and associated at least one location identifier, wherein the information includes a plurality of attributes, generating a hierarchy based on at least one location or at least one attribute, and displaying at least a portion of the information and the location as nested shapes corresponding to the hierarchy.

In one embodiment, a nested shape is associated with a weight that determines the size of the nested shape.

In one embodiment, the weight is calculated based on at least one attribute associated with a tag identification.

In one embodiment, the hierarchy comprising a plurality of hierarchically related locations or hierarchically related attributes.

In one embodiment, a plurality of the nested shapes in a first hierarchical level correspond to locations, and wherein at least one shape nested within at least one location corresponds to an object having an attached tag identification.

In another embodiment, the present invention includes a computer-readable medium containing instructions for controlling a computer system to perform a method of processing auto-identification data comprising storing a plurality of tag identifications, storing a plurality of locations, wherein each tag identification is associated with at least one location, storing information having a plurality of attributes, wherein each tag identification is associated with one or more of said attributes, and displaying at least a portion of the information and at least a portion of the locations as a treemap.

In one embodiment, the treemap includes a plurality of the nested shapes in a first hierarchical level correspond to locations, and wherein at least one shape nested within at least one location corresponds to an object having an attached tag identification.

In one embodiment, the method further comprises storing a plurality of time stamps, and displaying a time slider to allow a user to view changes in location or attribute values at different times.

In one embodiment, the treemap includes a fill according to at least one of said attributes.

In one embodiment, the treemap includes a plurality of nested shapes having associated weights that determine the size of the nested shape.

In another embodiment, the present invention includes an auto-id data processing system comprising a server for receiving a plurality of tag identifications and associated locations, wherein each tag identification is associated with at least one location, a repository for storing the plurality of tag identifications and locations, wherein the database further stores information having a plurality of attributes, and wherein each tag identification is associated with one or more of said attributes, and a visualization software system coupled to the repository for accessing the tag identifications, locations, and information, and in accordance therewith, displays at least a portion of the information and at least a portion of the locations as a treemap.

In one embodiment, the treemap includes a plurality of the nested shapes in a first hierarchical level corresponding to locations, and wherein at least one shape nested within at least one location corresponds to an object having an attached tag identification.

In one embodiment, the visualization software maps information in the repository to a display.

In one embodiment, the visualization software includes an aggregator component, a filtering component, a time navigation component, or a tracking component.

The following detailed description and accompanying drawings provide a better understanding of the nature and advantages of the present invention.

BRIEF DESCRIPTION OF THE DRAWINGS

FIGS. 3A-C illustrate auto-id hierarchies according to one embodiment of the present invention.

DETAILED DESCRIPTION

Described herein are techniques for displaying auto identification data. The following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein. Embodiments of the present invention may be implemented in software and stored on a computer-readable medium containing instructions for controlling a computer system to perform methods of processing auto-identification data as described below.

Figure 1:
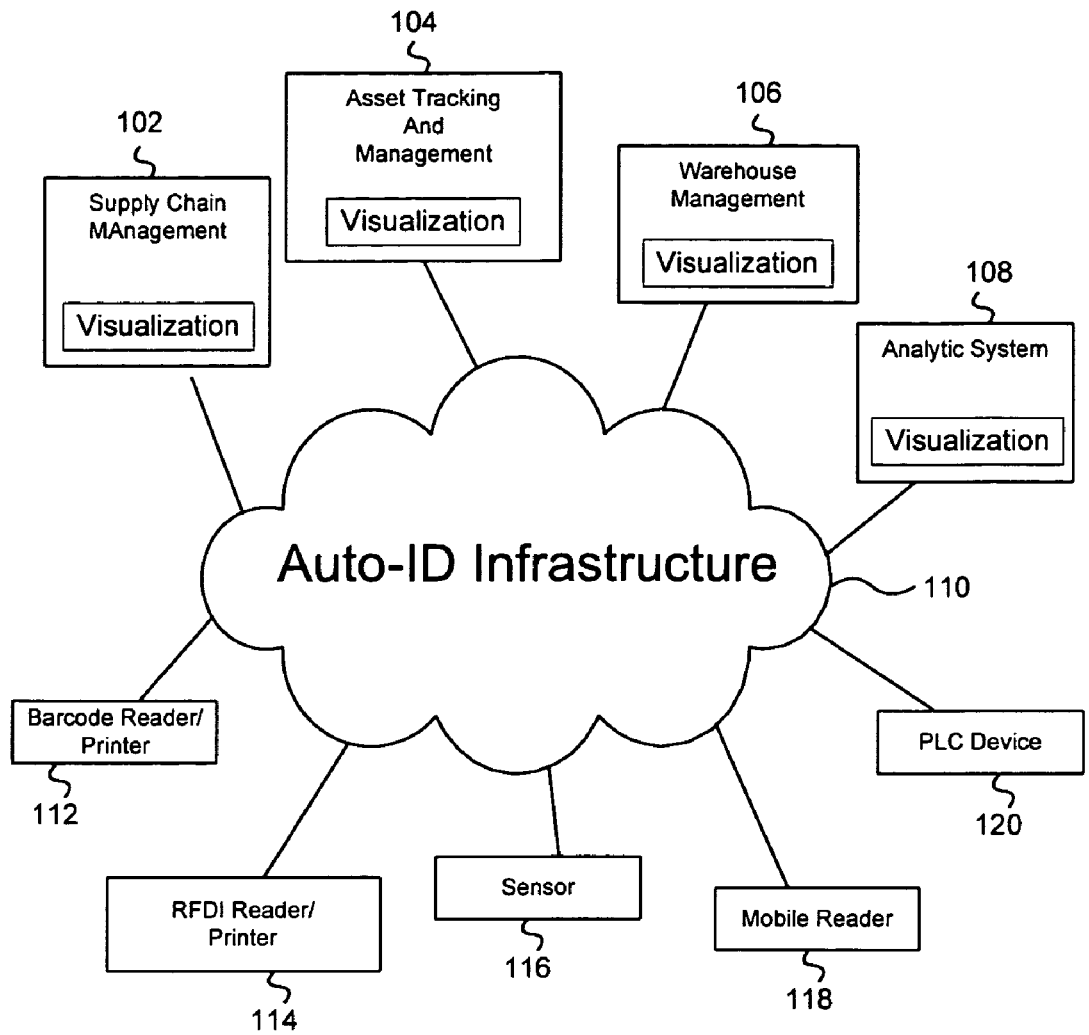
FIG. 1 illustrates a network diagram of an auto-id system.

FIG. 1 illustrates a network diagram of an auto-id system 100. In FIG. 1, a plurality of enterprise applications 102, 104, 106, and 108 may include a data visualization component for intuitively displaying auto-id data. Applications may include, as examples, a supply chain management application 102, asset tracking and management system 104, a warehouse management application 106, or an analytic system 108. Supply chain management application 102 may be used by an enterprise to oversee a process of producing, buying, shipping, or selling of products or services of the enterprise. The asset tracking and management system 104 may be used, for example, to monitor and track a number of assets within or across a site, an organization, or across organizations, in order to determine what assets (e.g., inventory assets) are available or unavailable to, or desired by, the enterprise. The warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise. Given the large amount of auto-id data in such systems, data visualization software and techniques described herein may be used to quickly and efficiently analyze the auto-id data.

In FIG. 1, auto-id information is obtained by the applications through the use of a middleware infrastructure 110, which implements an auto-identification (auto-id) system for automatically obtaining, storing, sharing, and using auto-id information. Auto-id systems support automatic gathering and use of information, such as information related to products sold or used by the enterprise, and include identifiers (e.g., tags) and readers for obtaining information about the identifiers. In FIG. 1, examples of auto-id elements include a barcode reader/printer 112, which may be used to read or print barcode labels attached to an object. An RFID reader/printer 114 is shown, which may be used to read information from, or assign information to, an RFID tag attached to an object. RFID tags may include either passive or active tags. The reader locations may be used to provide the tag location. A sensor 116 may refer to, for example, an environmental sensor (e.g., a thermometer), or a voice or an optical character recognition sensor. A mobile reader 118 refers to a reader that may be carried by a user for detecting an RFID tag or other auto-id identifier, for example. Finally in FIG. 1, a Programmable Logic Controller (PLC) device represents a digital controller used for applications such as on/off control, timing, logic, counting and sequencing. Other devices, such as a biometric device, can also be included.

The example enterprise applications in FIG. 1 illustrate the potential need for an enterprise to gather, share, and use auto-id data from across the system. For example, the supply chain management application 102 may need to know how much of a certain type of asset is currently available, based on data within the asset management application 104. The analytic system 108 may extract data from the auto-id middleware 110 and also from the other applications 102, 104, or 106, in order to discover performance issues (such as storage usage, reasons for delivery delay, or to validate progress of an item through a supply chain), problems (such as product counterfeit patterns), and the general visibility of the physical object (item, case, pallet). The analytic system 108 may report the discovered results through a portal system using visualization techniques described herein, for example.

As shown in FIG. 1, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
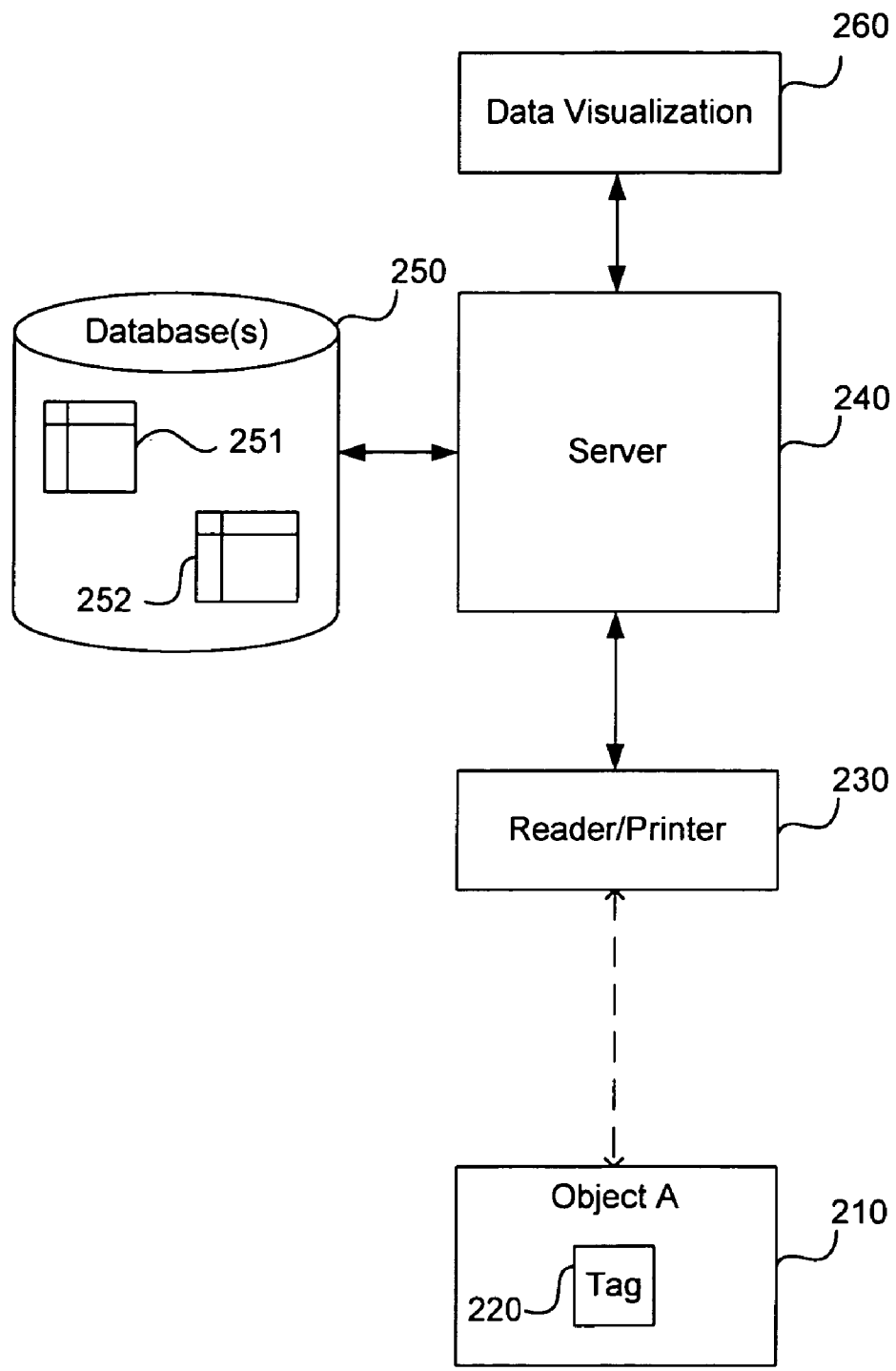
FIG. 2 illustrates an auto-id system that may be used to visualize auto-id data according to one embodiment of the present invention.

FIG. 2 illustrates an auto-id system that may be used to visualize auto-id data according to one embodiment of the present invention. Auto identification ("auto-id") system 200 includes an object 210 having a tag 220 attached thereto. Object 220 may be any of a variety of objects including, but not limited to, store merchandise, company assets (e.g., computers or medical equipment), or even people. Tag 220 may be an RFID tag, for example, and includes an identification stored electronically in the tag. A reader 230 located within range of tag 220 may retrieve the tag identification ("tag ID") from the tag using radio signals. A read transaction by reader 230 may be initiated by a read request, for example. In some embodiments, reader 230 may also be able to write (print) information to the tag 220. The location of the reader is typically known, so the retrieved tag ID may be associated with the known location of the reader 220. When a reader issues a read request, all the tags within range of the reader may return their tag IDs. Thus, reader 230 may receive numerous tag IDs from different tags, which may result in the location of the reader being associated with multiple tag IDs. The tag IDs received by reader 230 may be transferred to a server 240, which may, in turn, store the tag ID's in a storage facility. In one embodiment, tag IDs and locations are stored in one or more databases 250. Since tag IDs are associated with particular objects, other information about the objects may also be stored. In one embodiment, tag IDs, locations, and attributes of each object are stored in database tables, such as tables 251 and/or 252 in database 250.

Applications of the systems described in FIG. 1 and FIG. 2 may receive and store very large numbers of tag IDs from numerous readers located across a wide range of locations. Accordingly, a large amount of data may be generated as a result of implementing an auto-id system. Additionally, the system may store historical data at different points of time. As mentioned above, using this information can be challenging. In one embodiment, the present invention includes a data visualization software component 260 that organizes the auto-id information into a hierarchy and displays the information according to the hierarchy in an intuitive format including nested shapes to illustrate the hierarchical relationship of the data.

Figure 3C:
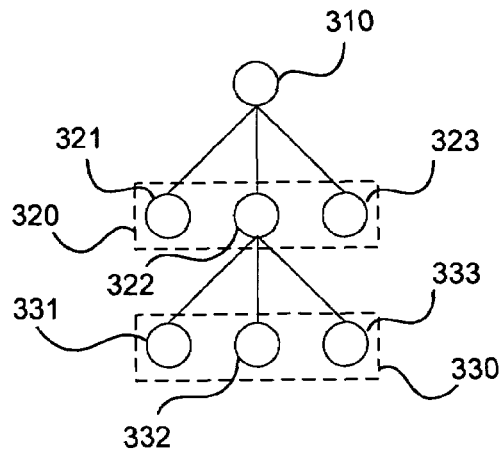
Figure 3C:
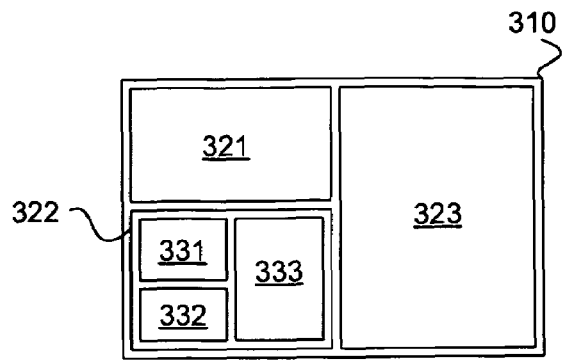
Figure 3C:
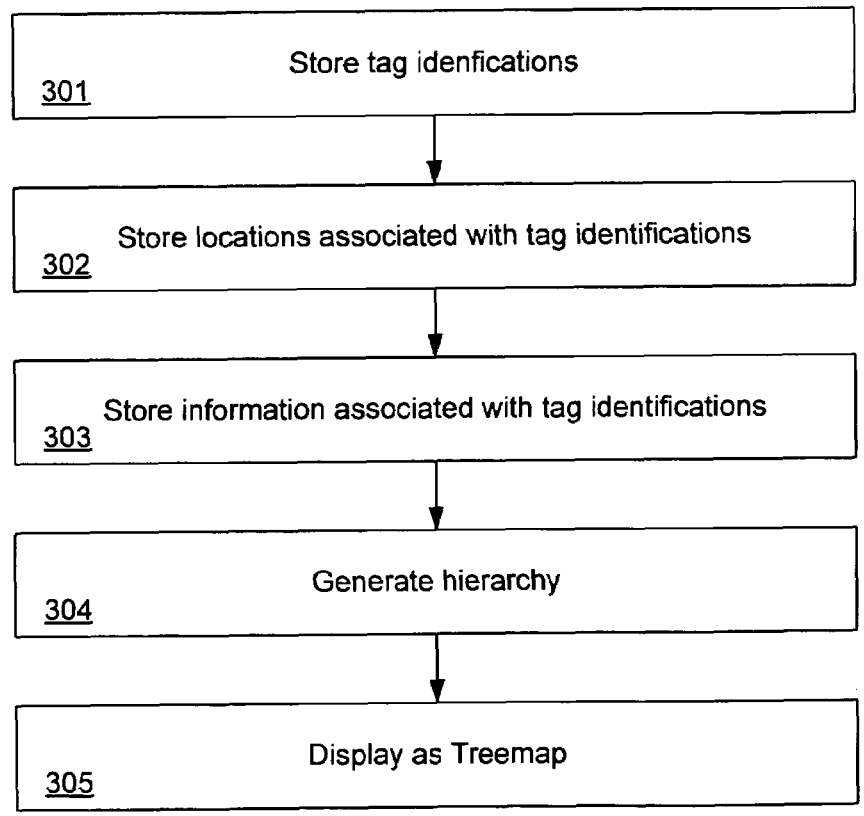

FIGS. 3A-C illustrate auto-id hierarchies according to one embodiment of the present invention. FIGS. 3A-B illustrate visualizing data hierarchically in a structure of nested shapes known as a treemap. A treemap visualization expresses information hierarchcially in a multi-dimensional mapping In this example, nested rectangles are used to represent the hierarchy in two dimensions. It is to be understood that other shapes could be used. The highest level of the tree hierarchy at node 310 in FIG. 3A may be expressed in the treemap as the outer dimension 310 in FIG. 3B. The other tree levels 320 and 330 in FIG. 3A within the tree hierarchy are expressed by the inner dimensions of the treemap in FIG. 3B. For example, the three nodes of information 321, 322, and 323 in FIG. 3A at the second level 320 are represented by rectangles 321, 322, and 323 in FIG. 3B nested within rectangle 310. Similarly, the three nodes of information 331, 332, and 333 in FIG. 3A at the second level 330 are represented by rectangles 331, 332, and 333 in FIG. 3B nested within rectangle 322. The tree hierarchies may be specified by a user according to a variety of different requirements. In some embodiments, the hierarchies may be changed interactively to view data in different ways.

In one embodiment, a treemap converts tabular data using a variety of weights and labels. The weight of a node may be determined by numerical data associated with the tag ID. Such data may be used to determine the size of a treemap node's bounding shape (e.g., the size of the rectangle). A node's weight may determine the display size and can be used as a measure of importance or degree of interest. For another example, a treemap visualization may follow a list of properties to convert a hierarchy into a visual display. For instance, if node 310 is an ancestor of nodes 320 (i.e., nodes at hierarchical level 320 are sub-nodes of node 310), then the bounding shape of node 310 completely encloses the bounding boxes of nodes 320. The bounding shapes of two nodes may intersect if one node is an ancestor of the other. For illustrative purposes, the present examples show the edges of rectangles across hierarchical levels with a separating space to illustrate the hierarchy. Additionally, the weight of a node may be greater than or equal to the sum of the weights of its children. In addition to setting the bounding shape of a node, other display properties such as color (hue, saturation, brightness), shape, shading, patterns, and borders may be set. In some applications, color may be an important visual property, because it can be a fast and accurate way to acquire information and make decisions. In one embodiment, the display may be implemented by mapping content information, such as locations, attribute values, and tag IDs, to display properties. For text-based data, as opposed to numeric-based data, colors can be assigned to distinguish unique fields.

FIG. 3C illustrates an auto-id method according to one embodiment of the present invention. At 301, the system stores tag IDs (auto-ids). For example, tag IDs may be retrieved by a reader and stored in one or more database tables. At 302, locations associated with the tag IDs are also stored. For example, tag IDs received by a particular reader may be associated with the known location of the reader, and the locations and tag IDs may be stored in a database. At 303, information associated with each tag may also be stored. For example, when a tag ID is received, the ID may be used to query data from a database to obtain information about the object to which the tag is attached. The location of the object may be stored together with such information. In one embodiment, information about each object may be stored as multiple attributes (e.g., such as a record in a database). Attributes such as object name, model, price, or any other useful attributes may be associated with the tag ID.

At 304, a hierarchy is generated. The hierarchy may include locations or values of attributes associated with a tag ID or both. For example, a tag ID may be associated with a location such as "Room 3471D," which may be the location of the reader that received the tag ID, for example. Such a room may be in the West Wing of the third floor in the East Division of a County Hospital. Accordingly, a hierarchy may be generated wherein "County Services" may be the top (or root) node in the hierarchy. "Hospitals" may be one of the sub-nodes under "County Services." "East Division" is a sub-node of "Hospitals," and the "third floor" is a sub-node of the "East Division." "West Wing" is a sub-node of the "third floor," and "Room 3471D" is a sub-node of the "West Wing." While location may be used for generating a hierarchy as described in the preceding example, it is to be understood that other information may be used to generate the hierarchy. In another embodiment, the hierarchy may be a plurality of properties of objects associated with the stored tag identifications. For example, a tag ID may be attached to a cell phone that is owned by a company and tracked as an asset. If a reader reads the tag ID, and the ID is used to retrieve information, then the information may include a "device type" attribute set to "cell phone," and thus "cell phone" may be one level of a hierarchy. The company may distribute many types of cell phones to employees, such as Motorola®, Nokia®, or those of other manufacturers. These manufacturer descriptors may be sub-nodes of the "cell phone" node in a hierarchy. Additionally, "cell phone" may be a sub-node of a "communication equipment" node, which may be a sub-node of an "electronic equipment" node, which may in turn be a sub-node of a "company assets" node. As these examples illustrate, almost any useful hierarchy can be specified and used for organizing the auto-id data. At 305, the hierarchy may be displayed as a treemap using nested shapes as shown in FIG. 3B, for example.

Figure 4:
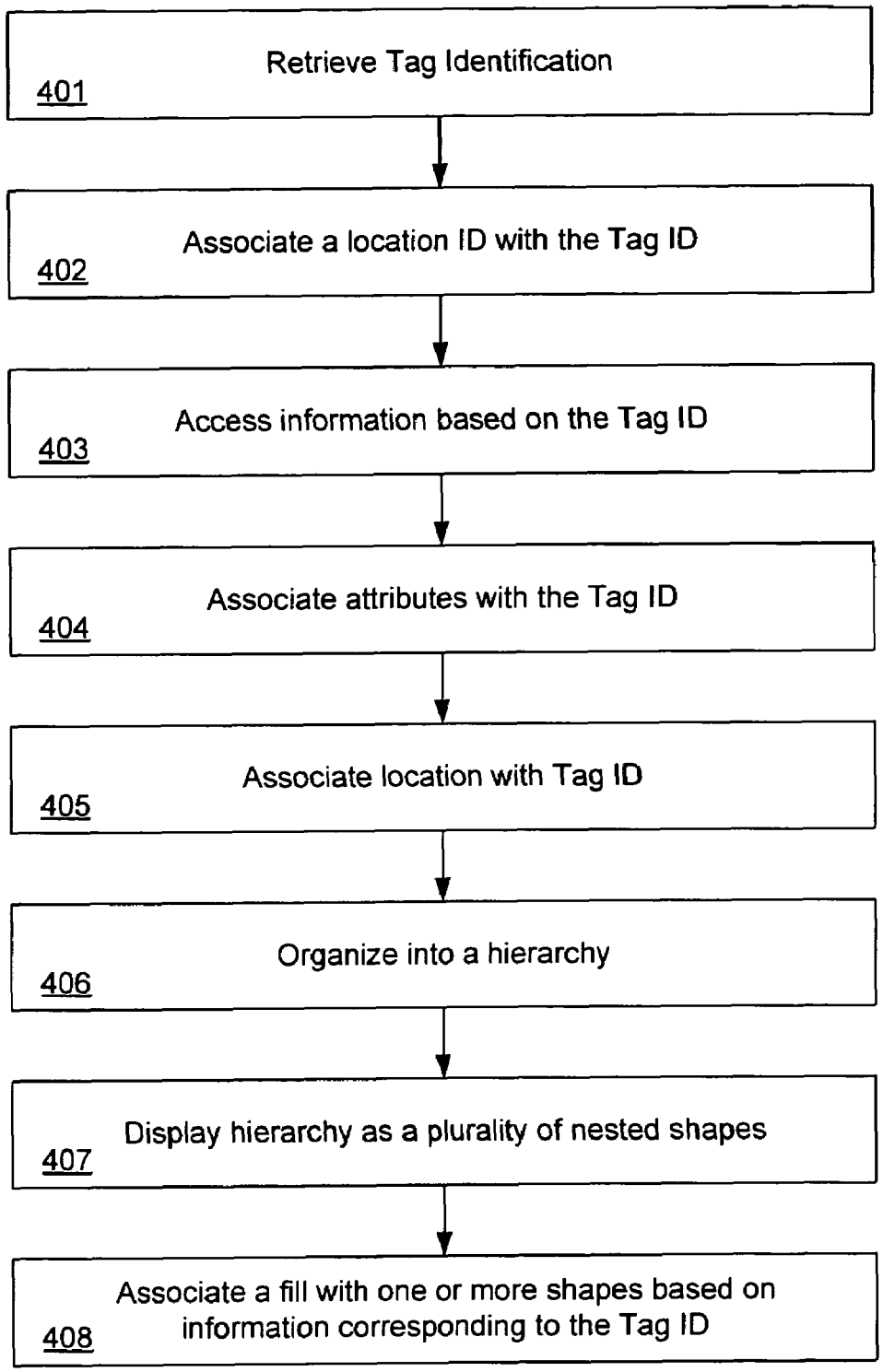
FIG. 4 illustrates a method of displaying auto-id data according to one embodiment of the present invention.

FIG. 4 illustrates a method of displaying auto-id data according to one embodiment of the present invention. At 401, a tag ID is retrieved, for example, by a reader. At 402, a location identifier (location ID) is associated with the tag ID. The location ID is used to determine the location of the reader that detected a particular tag ID. Since the tag ID is associated with the reader's location, these pieces of information may be used to associate all information about a particular object to which the reader is attached to particular locations. The location ID may be the known location of the reader that received the tag ID. Alternatively, the location ID may be a code, such as a reader ID, which may be used to look up the reader's location, for example. Once the tag ID and a designator of the reader location are determine, these pieces of information may be used to associate information about the object to which the tag ID is attached. For example, at 403 information may be accessed based on the tag ID. For example, the tag ID may be received in a server and used as the input query to a database. In response to the query, information about the tag may be retrieved. In one embodiment, the tag ID is used to access information in the database corresponding to the particular object to which the tag ID is attached. As illustrated at 404, attributes may be associated with each tag ID (e.g., name of the object to which the tag is attached, location, time, or any other useful properties), and the different attributes may take on different values over time. As illustrated at 405, location may be an attribute associate with the tag ID. For example, if the location ID is a number corresponding to a reader, the location ID may first be entered into a query to retrieve information about the reader. The location of the reader may be stored as an attribute of the reader, and such location may be accessed and applied to the location of the tag ID. At 406, the information may be organized into a hierarchy. For example, as described above, the hierarchy may be based on locations and/or attributes. At 407, the hierarchy is displayed as a plurality of nested shapes (e.g., rectangles or squares). At 408, a "fill" is associated with one or more of the shapes based on information corresponding to the tag ID. For example, the shapes may be "filled" with different colors, shades, patterns, or other visual identifiers depending on any type of information. Examples are shown in more detail below.

Figure 5:
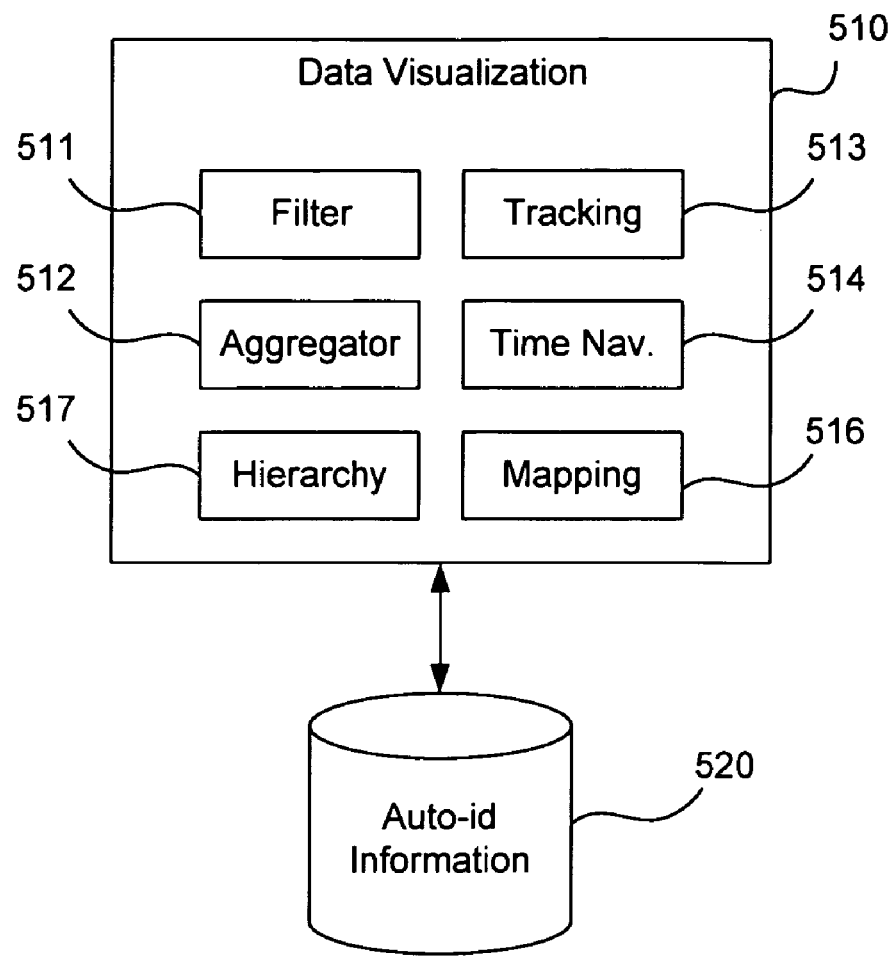
FIG. 5 illustrates an auto-id data visualization software system according to one embodiment of the present invention.

FIG. 5 illustrates an auto-id data visualization software system according to one embodiment of the present invention. Data visualization software 510 is coupled to a repository 520 of stored auto-id information including identifiers (i.e., referred to as auto-ids or tag IDs), locations, and information corresponding to the objects to which the identifiers are attached. Visualization software 510 may include software components for performing a variety of operations on the auto-id data including a filtering component 511, an aggregator component 512, a tracking component 513, a time navigation component 514, a mapping component 516, and a hierarchy component 517. It is to be understood that visualization software 510 may include a variety of other components for implementing the features and functions described herein.

Filtering component 511 may be used to filter data based on user preferences. For example, a user may specify ranges in numeric data to be displayed (e.g. top W rank, top X percentage, or between Y and Z). Filtered out data may be grayed out or hidden from view, for example. For text-based data, input form elements (check boxes, radio buttons, text boxes, etc) can be used to limit the visual display.

Aggregator component 512 allows data to be displayed with two types of granularity: aggregated and non-aggregated. When data is aggregated, each individual asset may not be displayed. Rather, an aggregate representation is shown. Numeric data can be aggregated in a variety of ways, including average, mean, maximum, minimum, or sum to name just a few. Text based data can be aggregated by count, for example. Count based aggregations may be displayed via gradated colors. Since data can be aggregated by location, storage type, or device type, aggregated visualization of auto-id data allows users to drill down into aggregated data types. By visualizing auto-id data including location and other information, the auto-id information can be aggregated, so a location average, maximum, or minimum may be displayed.

The example of FIG. 5 further illustrates a time navigation component. In some embodiments, time data (herein, a time stamp) may be stored with the tag ID, location, and other information about an object. For example, when a reader accesses a tag ID, the reader may also return a time value to specify the time when the tag ID was detected by the reader. As an object moves between different locations, historical data may indicate that a particular object was in different locations at different times. In one embodiment illustrated in more detail below, a time slider may be used to allow users to view the information at specific points of time. An object's location at a particular time will be shown based on the position of the time slider.

Embodiments of the present invention may also include tracking component 513. Tracking, such as asset tracking, for example, may track an object over time and location. Since the treemaps provide users with the ability to manipulate the data through filtering, aggregation, and time, objects may be tracked across different locations and at different times. In one embodiment, flags or other visual identifiers can be applied to treemap nodes to mark an asset. As an object moves over time, the visual identifier makes the movement of the object easy to identify.

Two other components of a data visualization software system 510 include a mapping component 516 and hierarchy component 517. Hierarchy component 517 may access specified auto-id data in repository 520 for building hierarchies. Hierarchies may be specified by a user (i.e., based on location or other information) or they may be programmed into the system as part of an application, for example. As mentioned above, mapping component 516 is used to map information in repository 520 to the display. Mapping component 516 may leverage the functions included in the other components to generate the displayed visualization of the data. Mapping 516 may also implement visualization for a variety of calculated data types, such as missing/misplaced objects, failure rates, utilization rates, age, movement rates, or a variety of other useful information. For example, a system may include an expected location, and the system may compare the expected location to the actual location and determine if an asset is misplaced or missing. Missing and misplaced assets can be highlighted by color or used for filtering. As another example, a system may track failures of devices. Failures may be tracked by rank (e.g., a device with the most failures) and/or percentage (e.g., percentage of devices of a certain type that have failed). For instance, the application may calculate the ranking and percentage of asset failures. The ranking and percentage may be used as an input variable for a treemap. This information can be visually displayed through the size of the nested shapes and/or the color or shading scheme displayed. The data set can also be filtered based on failures, for example.

In one embodiment, data may also be accessed to determine utilization rates. From this data set, the application may extract the ranking and percentage of utilized assets. The top and lowest percentage of assets may be used as input data for the treemap, for example. Utilization can be displayed via the size, color, or shading, for example, of the nested shapes. Utilization data may also be used for filtering. Table 1 shows other properties that may be displayed according to other embodiments of the present invention.

TABLE 1

| | |
|---|---|
| Age | For maintenance and asset depreciation use, it may be helpful to visualize the age of the assets. Age can be based on the date of purchase or the date of receipt. Age can be shown in the treemap through the gradation of color and can also be used as a filtering mechanism. |
| Operators | As work orders are assigned, data associated with responsible persons and asset operators can also be captured. For instance, in a manufacturing situation, the last known operator can be displayed in the treemap as a colored tree node or used as a filtering device. |
| Movement Rate | Movement rate can be captured by the number of times an asset moves within a given amount of time. The higher number of moves results in greater the movement rate. This information can directly translate to varying color and size within the treemap. |
| Read Rate | As location devices (e.g., RFID readers) capture data, a related device read rate and signal strength may be captured. This information can be translated into numerical data displayed via color in a treemap. |
| Condition | Asset condition can also be displayed with treemap visualization. Condition information may include status, utilization, temperature, or a variety of other indicators based on sensor data or condition information stored in the system. This information can be translated into numerical or textual data displayed via color gradation on the treemap. |

EXAMPLE APPLICATION

Figure 6A:
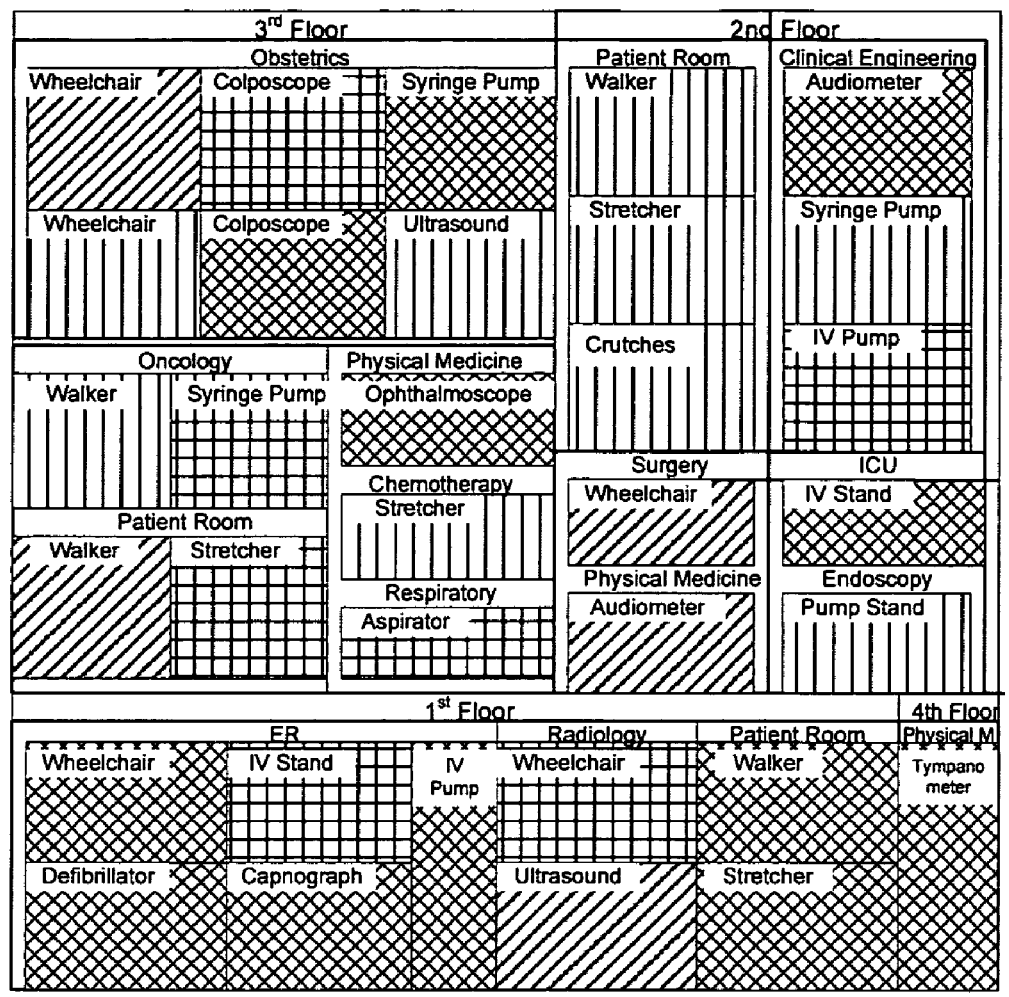
FIG. 6A is an example of a display of utilization rates for hospital equipment across multiple departments.
Figure 6A:
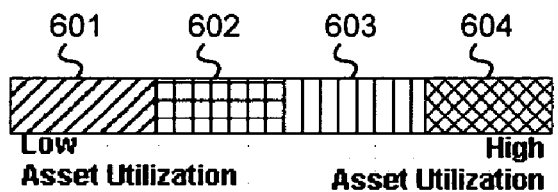

Features and advantages of the present invention may be more readily understood through the specific examples that follow. First, an example of the present invention as applied to a healthcare application is presented. FIG. 6A is an example of a display of utilization rates for hospital equipment across multiple departments. The sizes of each rectangle are roughly equal. Each rectangle corresponds to a particular piece of equipment, including wheelchairs, colposcopes, syringe pumps, ultrasounds, walkers, stretchers, audiometers, crutches, IV pumps, aspirators, etc . . . The pattern assigned to each rectangle is related to the utilization rate of the particular piece of equipment. The utilization rate ranges between pattern 601 (low utilization, below 20%) through pattern 604 (high utilization, above 90%). In other embodiments, different colors could be used or shades (e.g., a grayscale) to show the different utilization rates. From this figure, a hospital equipment manager within the clinical engineering department, for example, can identify the utilization rates of various locations. By combining the location and utilization rate, the manager can determine if equipment with low utilization rates should be moved to areas with higher utilization rates. For example, the second wheelchair in obstetrics may be moved to ER because ER only has one wheelchair with a high utilization rate. The second wheelchair is being under-utilized in obstetrics, as noted by the pattern.

Figure 6B:
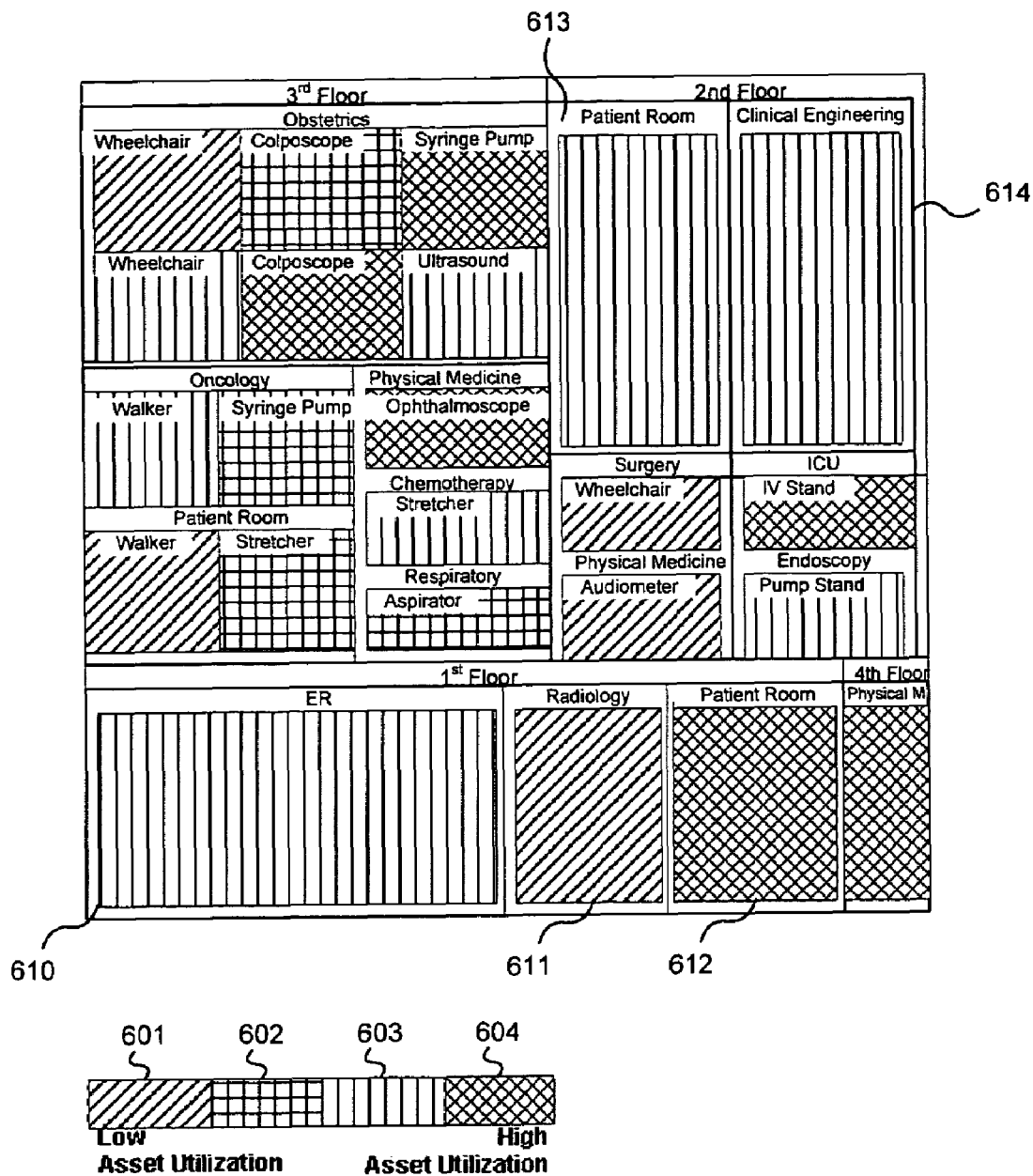
FIG. 6B is an example of aggregation according to another embodiment of the present invention.

FIG. 6B is an example of aggregation according to another embodiment of the present invention. As shown in FIG. 6B, information may be aggregated at one or more levels of a hierarchy. In this example, utilization rates of assets in the ER at 610, in radiology at 611, in a patient room(s) at 612, in clinical engineering at 614, and in another patient room(s) on the $2^{nd}$ floor have each been aggregated to show the average utilization rate of assets in each location.

Figure 7:
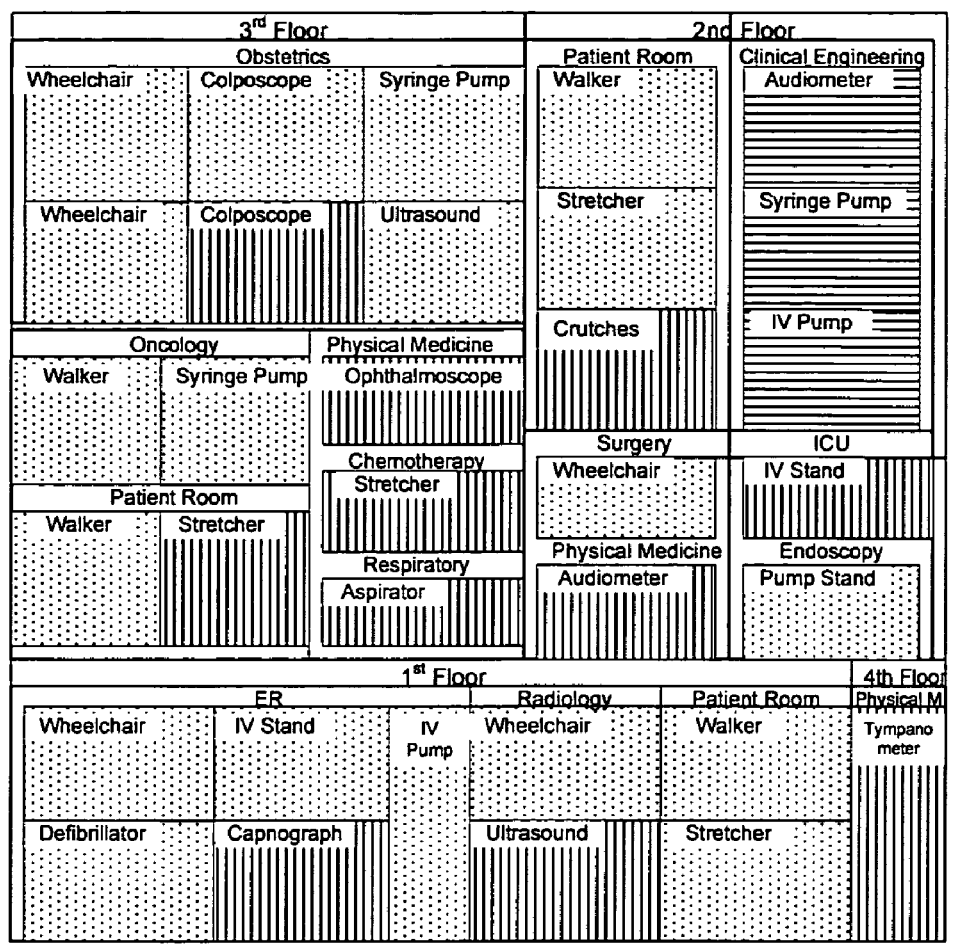
FIG. 7 is an example of a display of status for hospital equipment across multiple departments.
Figure 7:
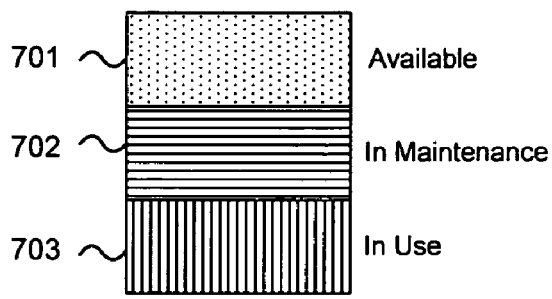

FIG. 7 is an example of a display of status for hospital equipment across multiple departments. Status includes: available 701, in maintenance 702, or in use 703. The rectangles are about equal size, and the patterns are related to the equipment's status. Pattern 701 indicates that an item is available, pattern 702 indicates that an item is in maintenance, and pattern 703 indicates that an item is in use. For example, if a hospital equipment manager receives a call from a nurse for an IV pump, he can easily see which available pumps are closest to the nurse. By combining the location and status, the manager can determine the overall state of the equipment across the hospital. This overall view of the hospital's equipment status will also allow the equipment manager to make more accurate choices about equipment purchases versus equipment rentals. If certain types of equipment are used heavily or are constantly in maintenance, then the equipment manager can decide whether to rent or purchase more equipment.

Figure 8:
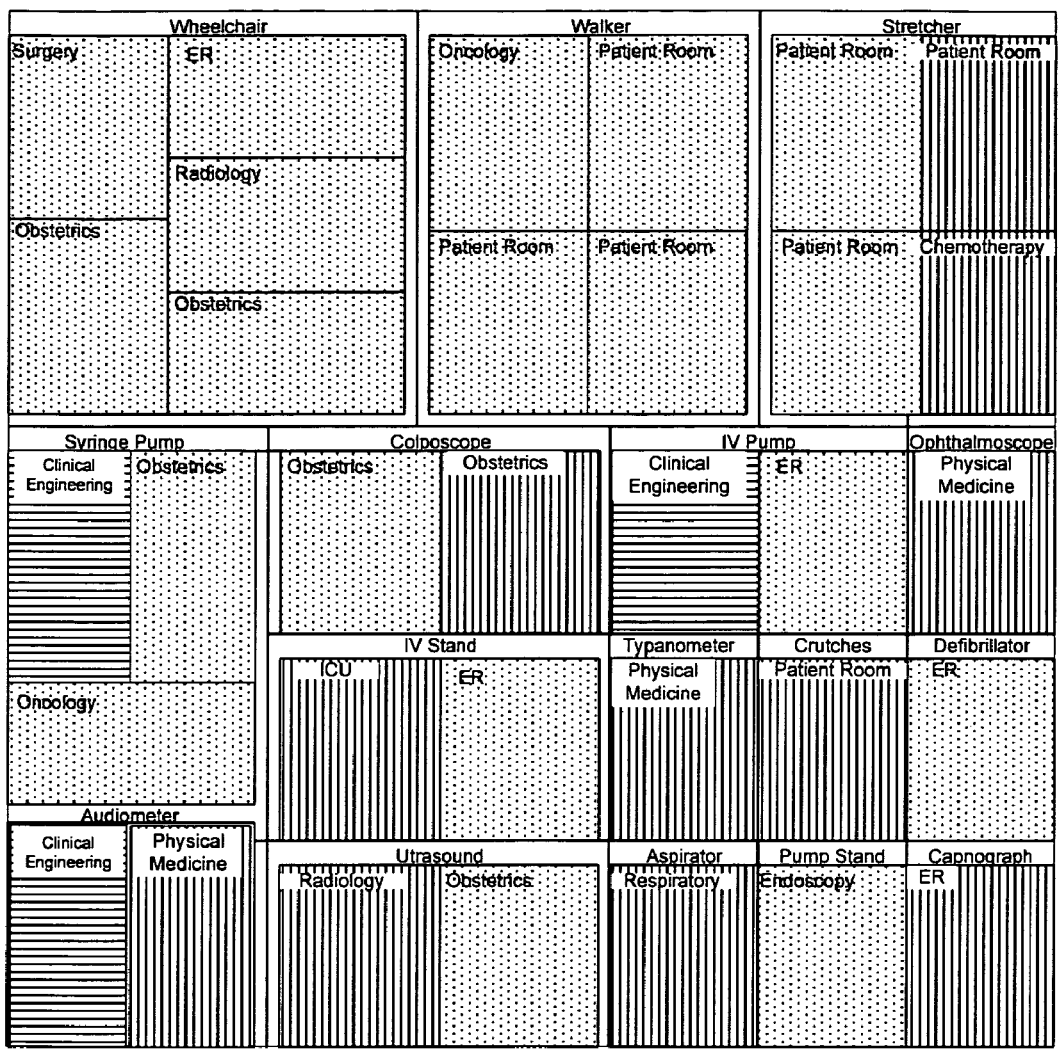
FIG. 8 is an example of a display according to another embodiment of the present invention.
Figure 8:
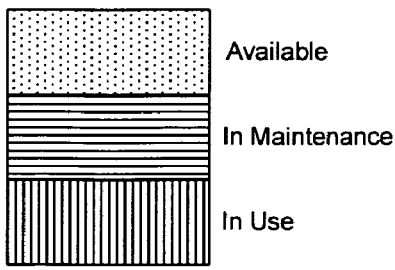

FIG. 8 is an example of a display according to another embodiment of the present invention. This example shows the same information in FIG. 7 with the hierarchy modified so that the data is grouped by equipment type, department, and equipment, rather than grouping the data by floor, department, and equipment. With this change, an equipment manager can see the status of equipment by equipment type, which will facilitate easier identification of available equipment.

Figure 9:
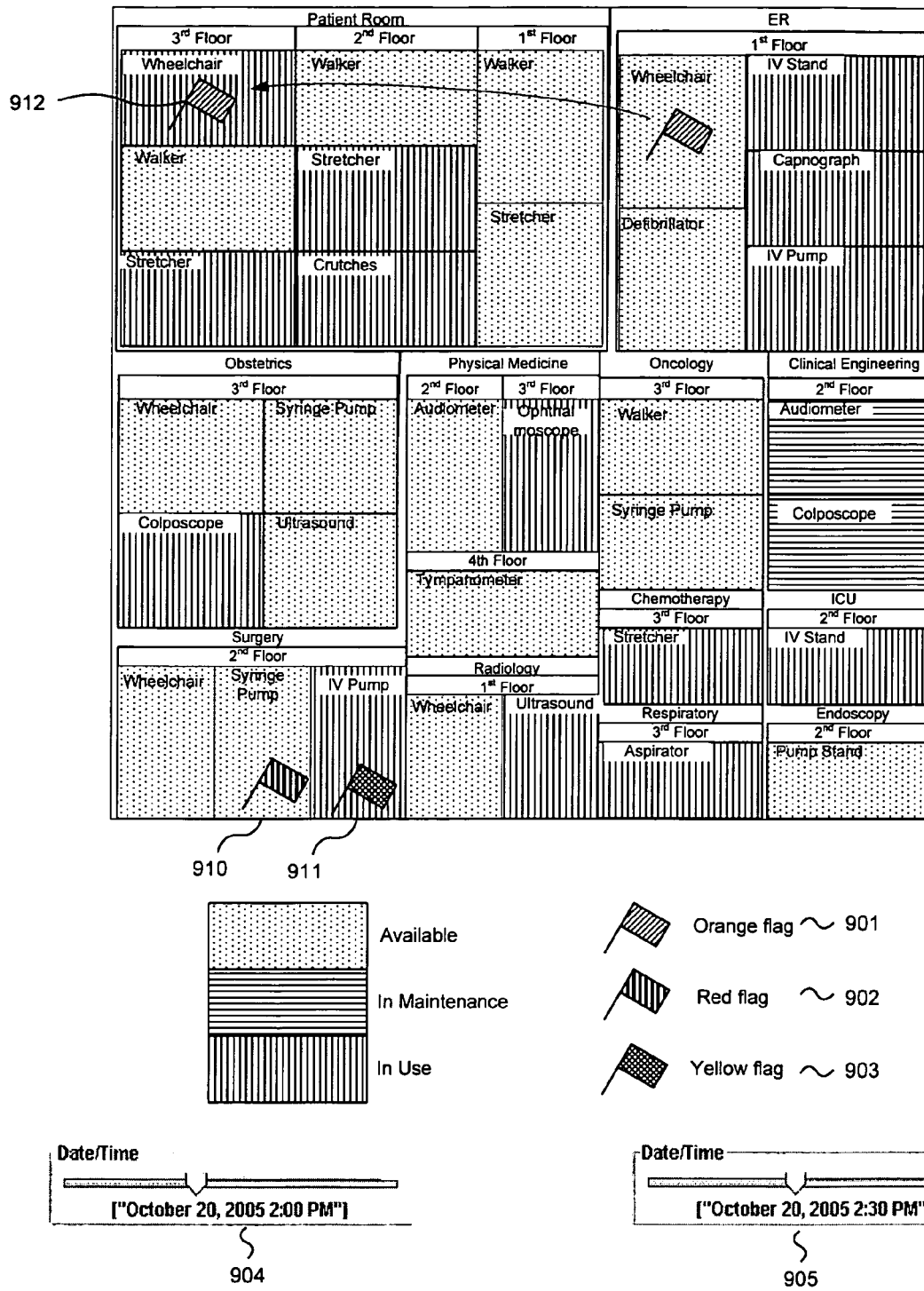
FIG. 9 is an example of a display that tracks objects over time according to another embodiment of the present invention.

FIG. 9 is an example of a display that tracks objects over time according to another embodiment of the present invention. This example visualization shows how assets move over periods of time. In one embodiment, particular objects may be associated with visual identifiers, such as a flag. For example, a syringe pump and IV pump on the second floor in the surgery department may be associated with flags 910 and 911, for example, and a wheelchair on the first floor in the emergency room ("ER") may be associated with flag 912. In one embodiment, the flags are associated with different colors such as orange 901, red 902, or yellow 903. These colored flags may be placed over specific assets the user wishes to track, for example. Furthermore, in one embodiment, a time slider, as shown at 904 and 905, may be used to view the information at different times. For example, information associated with each auto-id may include time stamps that may be used to indicate the time an object is in a certain location, for example. Here, a visual time slider 904 is set to Oct. 20, 2005 at 2:00 pm. Accordingly, at this time the marked syringe pump 910 and IV pump 911 are shown in the $2^{nd}$ Floor Surgery and the marked wheelchair 912 is shown in the $1^{st}$ floor ER. However, the time slider may be changed to Oct. 20, 2005 at 2:30 pm. The visualization has now changed to reflect the asset distribution at that time. The flags are still associated with their given equipment, but the wheelchair has moved to the third floor patient's room. This visualization of the RFID information makes it easy to see how the equipment has moved over time. Also, equipment status has also changed over time. At 2:00, the wheelchair was "available." At 2:30 pm, the wheelchair is shown as "in use." Accordingly, objects may be displayed in multiple locations in the first hierarchical level (e.g., across different floors) to illustrate the change in status (e.g., movement) of the object over time.

Figure 10:
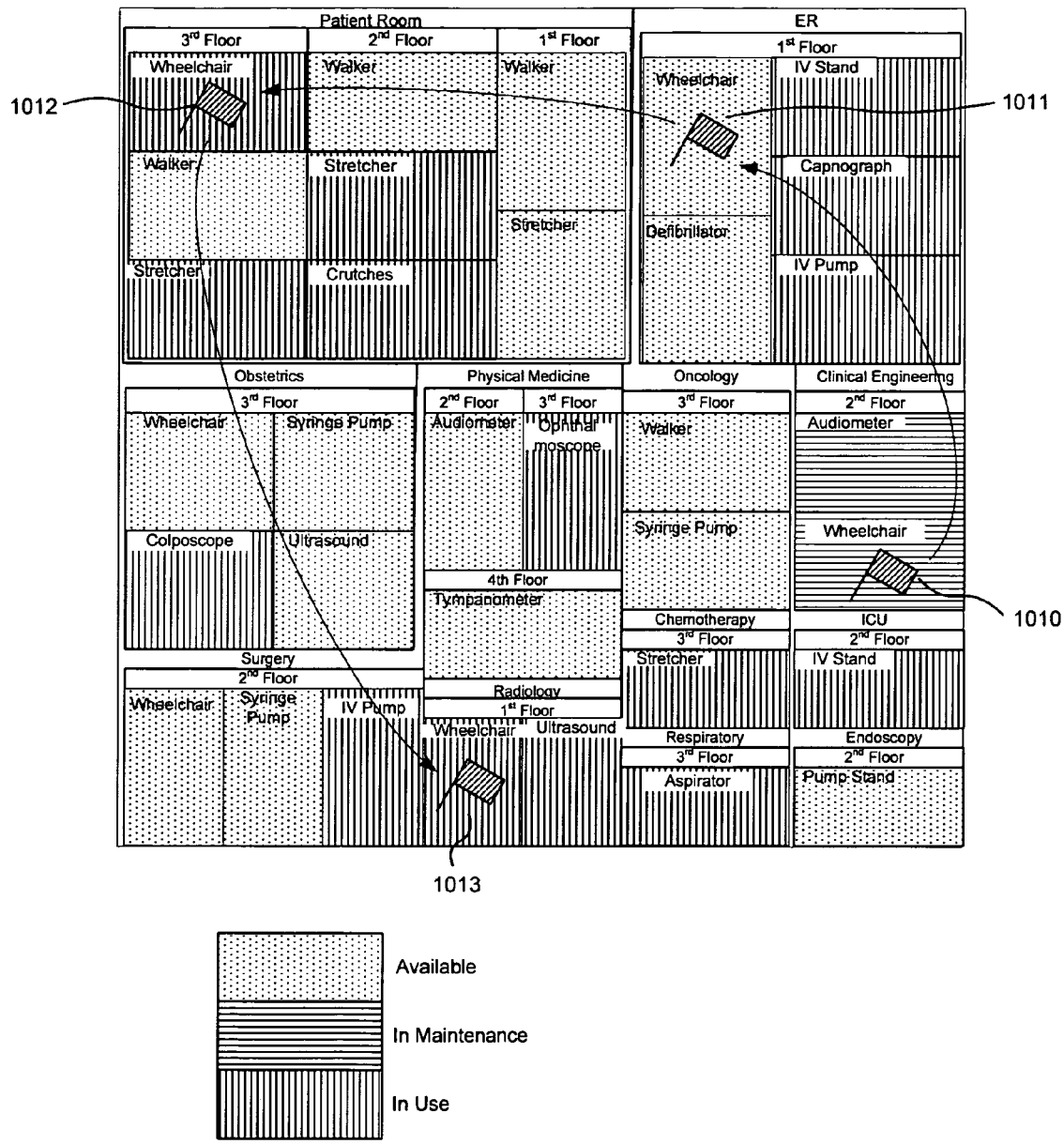
FIG. 10 is an example of a display that tracks objects over time according to another embodiment of the present invention.

FIG. 10 is an example of a display that tracks objects over time according to another embodiment of the present invention. In this example, a single object is shown at different times on a single display. For instance, a time range may be specified and the information for a particular object may be illustrated as it changes in time. At 1010, a wheelchair may be on the $2^{nd}$ floor of the clinical engineering department on Monday with a status "in maintenance." On Tuesday at 1011, the wheelchair may be on the $1^{st}$ floor of the ER with a status "available." On Wednesday at 1012, the wheelchair may be on the $3^{rd}$ floor of a patient room. On Thursday at 1013, the wheelchair has move again to the $1^{st}$ floor of Radiology. The ability to track equipment movement and status over time allows the equipment manager to view equipment activity from a high level perspective. This also allows a user to ascertain any problems or issues by reviewing historical equipment movement.

Figure 11:
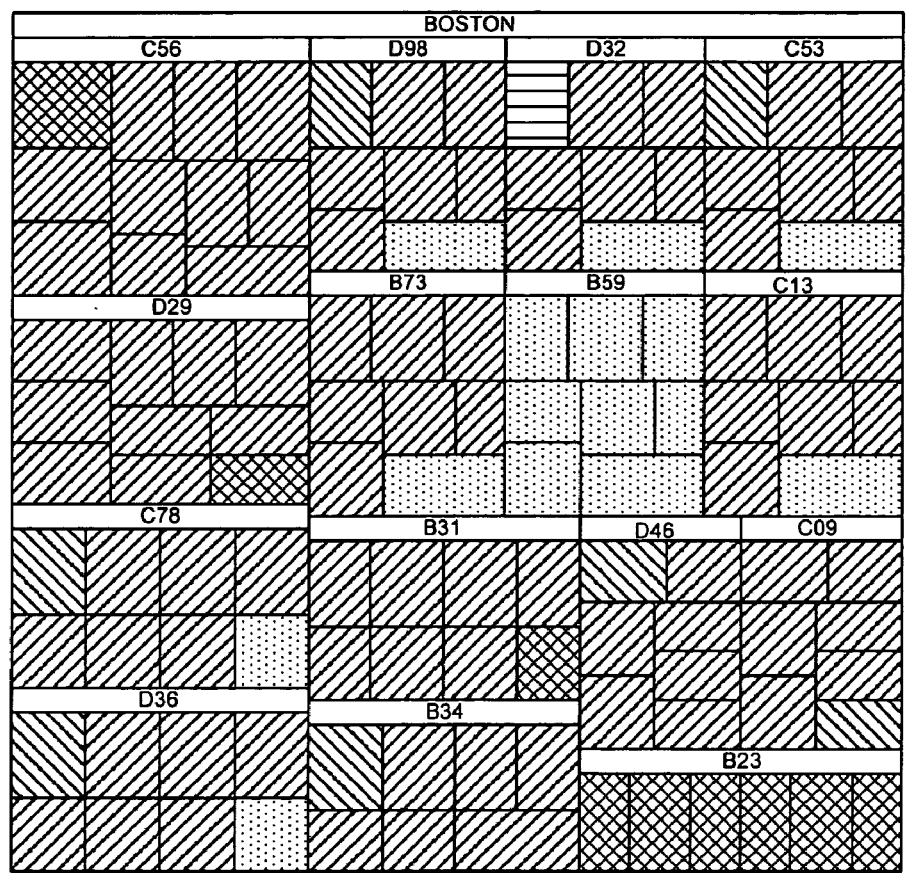
FIG. 11 is an example of a display that shows a distribution of equipment over different locations according to another embodiment of the present invention.
Figure 11:
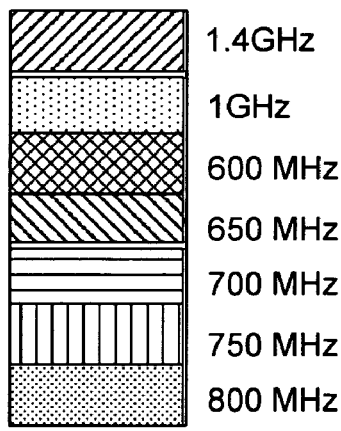

FIG. 11 is an example of a display that shows a distribution of equipment over different locations according to another embodiment of the present invention. In FIG. 11, the distribution of laptops across multiple rooms at a conference is shown. The size of each rectangle is proportional to the cost of each laptop, and the pattern shows the different processor speeds for each laptop. With this visualization, an information technology ("IT") events manager can easily see which rooms have what type of laptops. The user can match the workshop requirements to the laptop distribution. For example, certain conference rooms may have different requirements as follows: room B23 does not need high speed laptops, all other rooms need to have laptops with at least 1 GHz processors, and one laptop per room will be used as a projector, so it can have lower processing speed. With these requirements in mind, the visualization of the auto-id data indicates to the user that room B23 has only 600 MHz processors and the processors in rooms B73 and C13 are at least 1 GHz, and therefore, these rooms can have at least one of their laptops switched for a lower processing speed.

Similarly, other embodiments of the present invention may be used to identify misplaced objects, track the degree of movement, identify the age of an object, or determine the read rate by auto-id readers. For example, in one embodiment the size of each rectangle may be equal for all laptops. The pattern or color associated with each rectangle may show all laptops that are currently misplaced (e.g., an auto-id reader detects an object in a location that is different from where it was expected to be). For instance, if a laptop is expected in one room but is placed in another or is not recorded by any readers, then the rectangle corresponding to the laptop will be highlighted or patterned to indicate that the laptop has been misplaced. Accordingly, an IT events manager can easily see which laptops are currently misplaced. Similarly, objects may be associated with degree of movement. For example, a pattern or color used to fill a rectangle on a display may be proportional to the movement level. Particular patterns or light coloring may indicate that the object has not been moved often, whereas other patterns or darker coloring may indicate that the object has been moved often. In other embodiments, the age of assets can also be distinguished by patterns or shades of color. For example, a brighter green may be used to denote a newer asset, and a dark gray may be used to denote an older asset. Using age visualization, an IT events manager can identify older laptops by their color and the depreciated cost of the laptop. The distribution of the older assets throughout a facility may also be determined. In another embodiment, the read rate may be monitored so that readers or objects with potentially problematic auto-id components may be identified. For example, read rate may be associated with a color or pattern and displayed in a treemap. From the treemap, an IT events manager can identify problematic readers and laptops by location. Since the objects are grouped by location, locations with dark colored cells may indicate a failed reader, for example.

Figure 12:
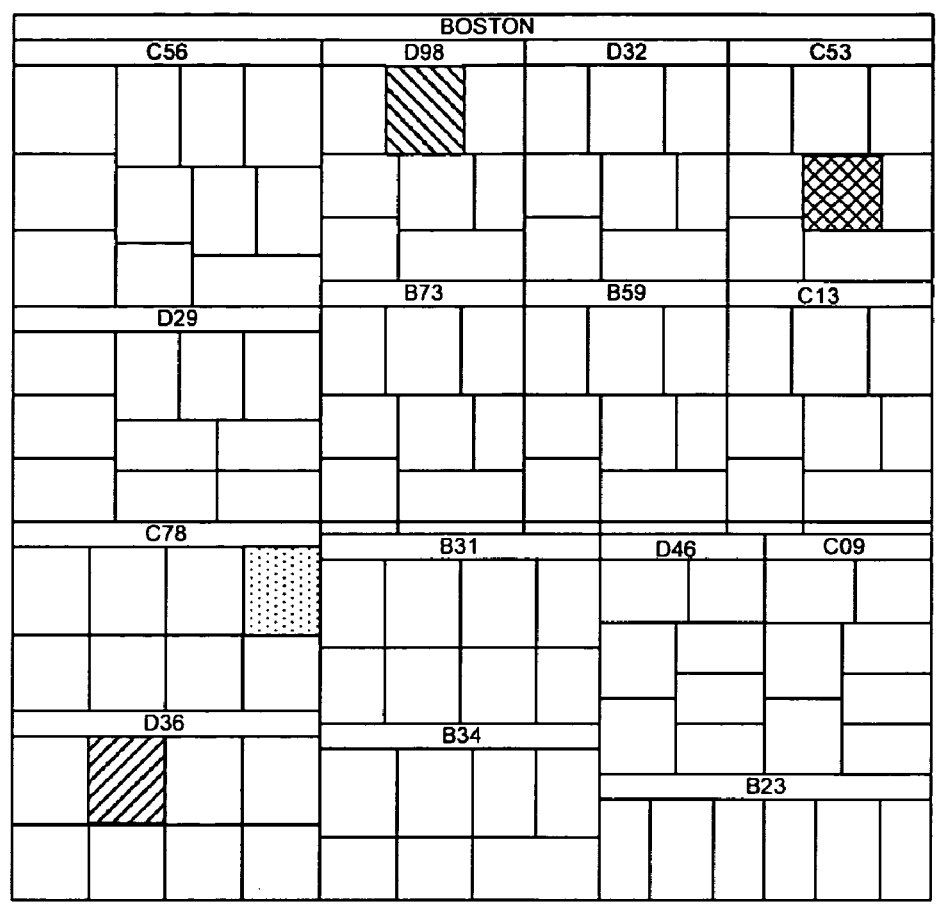
FIG. 12 is an example of filtering according to another embodiment of the present invention.

FIG. 12 is an example of filtering according to another embodiment of the present invention. In some embodiments, portions of data relating to auto-ids may be displayed while others are hidden from view to allow users to focus in on particular attributes of the data. For example, in one embodiment, the data may be filtered to display operators of missing or misplaced assets. Assets that are not missing may be filtered (e.g., blacked-out), so the missing assets are easy to identify. For instance, laptops may be distributed to various rooms at a conference center. The size of each asset may be displayed in proportion to the cost, and the color or pattern may be related to a different operator. From this visualization, the IT events manager can easily identify the location of the missing assets and the person responsible. From this view, a user can also identify personnel who have mismanaged a large number of assets.

As another example, the treemap may illustrate a distribution of customer tools at a multiple contract manufacturing plant. For instance, one contract manufacturer may manufacture products for different customers. Each customer manufacturing job may require different tools (e.g., tools for job A/customer A, job B/customer A, job A/customer B, etc . . . ). The tools may be equipped with auto-ids so that the location of each tool may be ascertained in a manufacturing facility, and the ID of each tag associated with a job and/or customer. A top level hierarchy of a treemap may correspond to the company, and a first level may correspond to manufacturing facilities. Lower levels may specify particular locations in each facility. The size of each shape in a treemap hierarchy may represent the cost of the asset, and the color or pattern may represent a customer. Accordingly, if a user desires to locate all the tools required for job F/customer Z, a user may filter the treemap and interactively move down to the level necessary to identify the location of the desired tools. Accordingly, an account manager can identify facilities that currently contain a particular customer's assets and plan the execution of a job, for example.

In another embodiment, the filter may be set to show certain failure rate of equipment. For example, a visualization may identify the top % or top ranked failed assets. The size of shapes in a treemap may represent the cost of the asset, and the pattern or color may represent a type of asset (e.g., a tool in a manufacturing plant). Only the shapes corresponding to the top 10 highest failure rates or the top 5 most expensive failed assets, for example, may be illustrated. Accordingly, a tools manager can identify the top ten failed tools, for example. From this visualization, a user can determine that particular assets require large investments that are prone to failure.

In yet another embodiment, filtering may be used to identify missing assets according to safety levels. For example, some assets (tools or materials) in a manufacturing plant may be more dangerous than others to employees. Such items may include auto-ids that can be associated with safety levels in a database. This information, together with location information obtained during a read, may be used to visualize dangerous assets in a facility. For instance, a treemap visualization may identify missing assets with the highest safety levels. The size of each treemap shape may represent the cost of the asset, and the color or pattern may represent the safety level. Filtering may be used so that the highlighted assets are limited to the highest safety level (e.g., safety levels 4 and 5 on a scale of 1-5, where 1 represents a safe asset and 5 represents the most dangerous class of assets). From this figure, the tools manager can identify missing tools with safety level 4 and 5. From this visualization, a user can determine which assets should be located immediately, because of potential harm to employees. The user can also identify the locations (e.g., manufacturing facilities) with the most missing assets, for example.

EXAMPLE AUTO-ID INFRASTRUCTURE

Figure 13:
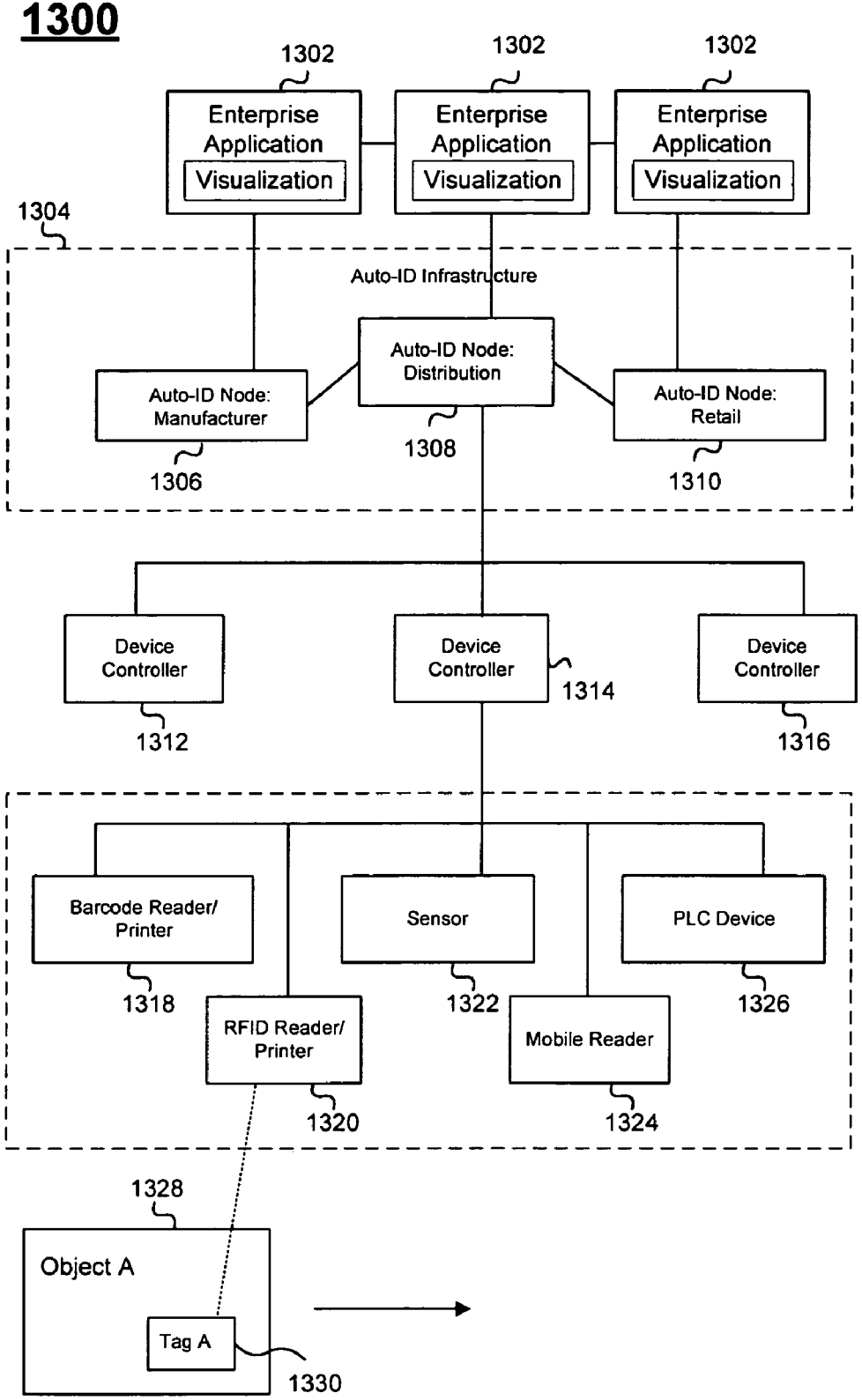
FIG. 13 is a block diagram of an example auto-id system.

FIG. 13 is a block diagram of an example auto-id system In FIG. 13, enterprise applications 1302 may include the various applications 102-108 from FIG. 1 discussed above, as well as various other enterprise applications. One or more of these applications may include a visualization component to perform the techniques described above for visualizing the auto-id data.

Auto-id infrastructure 1304 may represent some or the entire middleware infrastructure 110 of FIG. 1, for example. In particular, the auto-id infrastructure 1304 includes auto-id nodes 1306, 1308, and 1310. The auto-id nodes 1306, 1308, and 1310 generally represent nodes at defined locations that are designed to associate information obtained by the auto-id devices 1318-1326 with existing business logic or data. Further, the auto-id nodes 1306, 1308, and 1310 may be used to store historical information for products or objects that have been tracked by the auto-id devices/systems 1318-1326. Such historical information may include, for example, status information at a particular time, object location, environmental information related to the tracked object(s) or to a specific location, and information for multiple objects that has been collected and combined for a desired purpose.

The auto-id nodes 1306, 1308, and 1310 may be strategically placed throughout the enterprise, or across multiple enterprises. For example, one or more auto-id nodes 1306 may be located at a manufacturing site, while auto-id nodes 1308 may be located at a retail product distribution site, and auto-id nodes 1310 may be located at a retail store. Additionally, one or more auto-id nodes can be provided at sites of a raw materials supplier, a manufacturing plant, a manufacturing distribution center, and a transportation service. In this way, information that is particular to an actual setting of an auto-id node may be obtained and retained only at that particular node.

For example, the auto-id node 1310 at a retail store may be used to track a retail price of an item, or a number of items on a shelf of the retail store. Such information may not be useful to the auto-id node 1306 at a manufacturing plant location, but may be partially useful to the auto-id node 1308 at the retail distribution location. For example, the auto-id node 1308 at the retail distribution location may not be interested in the retail price of an item, but may be interested in a number of presently-shelved items (for purposes of re-stocking).

Similarly, business processes and business logic at the different sites, such as visualization software described above, may benefit from the use of the localized auto-id nodes 1306, 1308, and 1310. For example, the retail auto-id node 1310 may include a workflow for preventing theft of objects, while the manufacturing auto-id node 1306 may be interested in monitoring a quantity of objects produced in a particular time period. Thus, by using a dispersed network of localized auto-id nodes, the system 1300 may process information more efficiently, and in a manner that is more useful to the users at the various locations.

Each auto-id node in the system 1300 may include one or more device controllers, illustrated in FIG. 13 as device controllers 1312, 1314, and 1316, which are associated with the distribution auto-id node 1308. Of course, each of the auto-id nodes 1306, 1308, and 1310 may have fewer or greater numbers of device controllers, or may not use device controllers at all.

Referring to the device controller 1314 as an example, FIG. 13 illustrates that the device controller 1314 may be used to oversee and coordinate the operation of some or all of the auto-id devices 1318-1326. Of course, the device controllers 1312 and 1316 may be used to oversee the operations of similar auto-id devices that may be connected to those device controllers.

More specifically, the device controller 1314 may be used to process data from the auto-id devices 1318-1326, so as to increase an efficiency of its associated auto-id node 1308. For example, the device controller 1314 may remove extraneous information, or may combine or modify data in a manner specified by the auto-id node 1308 in a way that is useful to the distribution function of that auto-id node, and/or in a way that is useful to the enterprise applications 1302.

Thus, the auto-id node 1314 coordinates and manages the auto-id devices 1318-1326, perhaps based on instructions from the auto-id node 1308, and relays (processed) information from the auto-id devices to the auto-id node 1308. For example, the auto-id node 1308 may be used to instruct the device controller 1314 to obtain a particular class of data (such as, for example, quantity) with respect to an object 1328 (for example, a toy or other item to be distributed to retailers for sale). Then, the device controller 1314 may use the RFID reader/printer 1320 to obtain this information from a tag 1330 associated with the object 1328, and may then remove any undesired information that is concurrently obtained before passing on the information that a certain number of the object in question is available to the auto-id node 1308.

As another example, the auto-id node 1308 may instruct the device controller 1314 to assign information to the object 1328. For example, the device controller 1314 may use the RFID reader/printer 1320 to change a current price of the object 1328 (e.g., to store new price information on, or in association with, the RFID tag 1330 attached to a certain class of object).

From FIG. 13, it should be understood that, just as each of the device controllers 1312, 1314, and 1316 may be used to filter, aggregate, write, or otherwise manipulate data with respect to all of its associated auto-id devices and/or environment devices 1318-1326, the auto-id node 1308 is operable to filter, aggregate, assign, or otherwise manipulate data for its associated device controllers 1312, 1314, and 1316. In this way, the auto-id node 1308 may integrate information from its device controllers 1312, 1314, and 1316 with business processes that may be operational on one or more of the enterprise applications 1302.

By extension, it may be seen that the enterprise applications 1302 are operable to aggregate information from all of the auto-id nodes 1306, 1308, and 1310. Further, it should be understood that information that is useful at one level of the system 1300 may not be as useful at another level. For example, the enterprise applications 1302 may not be interested in, or able to use, low-level (e.g., item-level) information that is collected by the reader/printer 1320. Rather, the enterprise applications 1302 may only be interested in that information to the extent that the information is filtered and/or aggregated by the device controller 1314 and/or the auto-id node 1308.

As a result of the described architecture, it should be understood that business logic from the enterprise application 1302, and/or from multiple enterprise applications, may be supported in the auto-id middleware (e.g., as part of the auto-id infrastructure 110 of FIG. 1). Further, such multiple enterprise applications may be supported with a single physical hardware system and a single auto-id middleware that are common to all of the enterprise applications.

Figure 14:
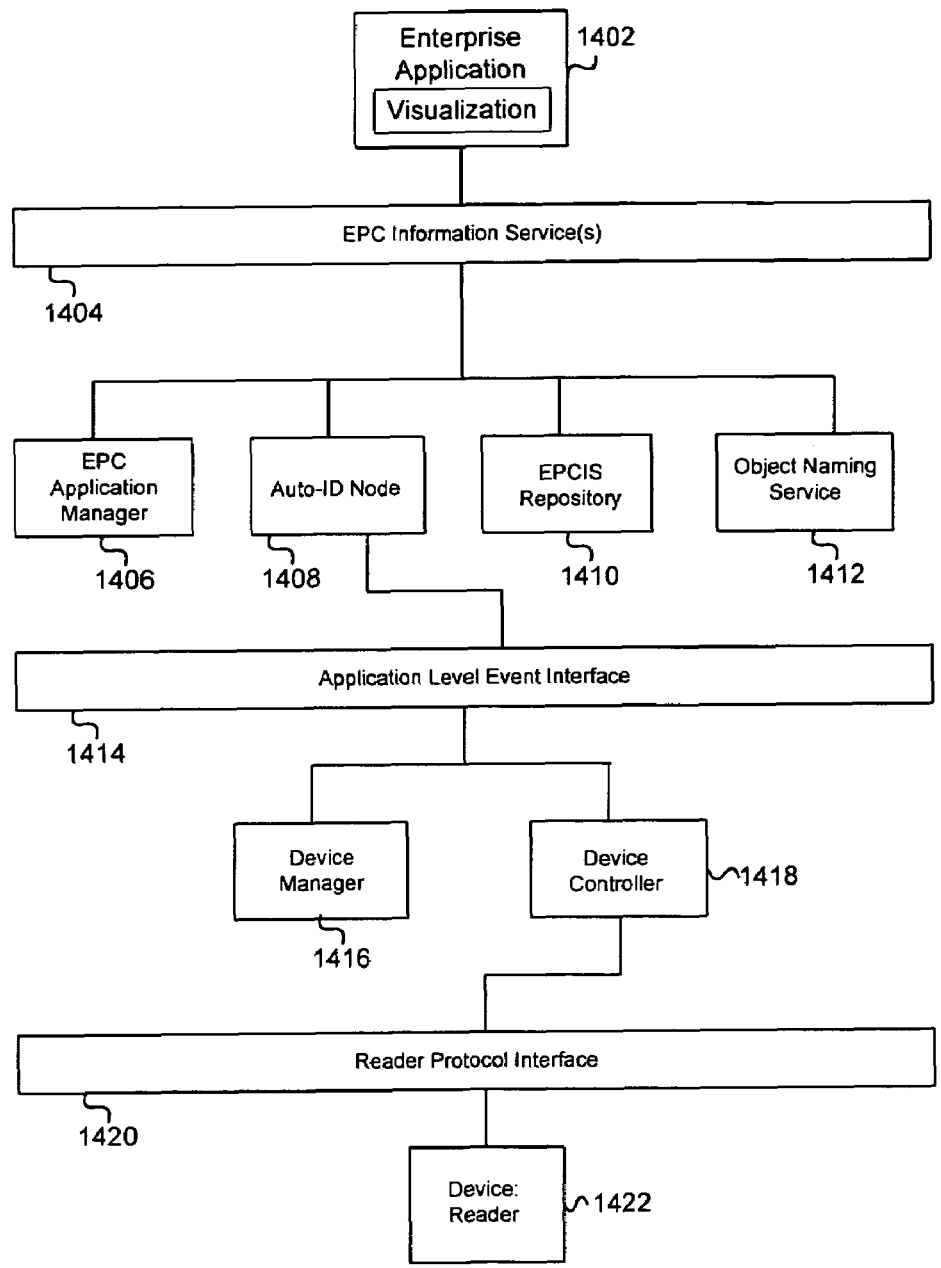
FIG. 14 is a block diagram of an example network architecture for use with the auto-id infrastructure of FIG. 13.

FIG. 14 is a block diagram of a network architecture 1400 for use with the auto-id infrastructure 1304 of FIG. 13. More specifically, FIG. 14 illustrates an architecture by which the auto-id infrastructure 1304 of FIG. 13 may be used with an Electronic Product Code (EPC) that has been developed for use with auto-id systems.

The EPC refers to a unique number, similar to a Uniform Product Code (UPC) identifier, that has a pre-defined format and scheme that multiple organizations and enterprises have agreed to use in uniquely designating and identifying their respective products, goods, services, or collections thereof (e.g., pallets, cases, or truck-loads). In the context of RFID systems, then, the EPC may be assigned to the tag 1330 on the object 1328 of FIG. 13. A classic EPC, for example, is defined by four fields: header field (to distinguish different formats), manufacture field (each organization that assigns the EPC has its own manufacture field), product field (product code), and serial number (with the product).

In FIG. 14, an EPC Information Services (EPCIS) layer 1404 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the extensible Mark-up Language (XML) may be used for the above-described transfer and use of business-level EPC information.

The EPCIS layer 1404 receives information from an application manager 1406, which is generally operable to oversee information events (e.g., tag reads) and manage the events for communication to the EPCIS layer 1404 and thereby to an EPCIS repository 1410. The application manager 1406 operates to monitor and configure the repository 1410 as the repository 1410 accumulates data over relatively long periods of time during which the data may not be immediately useful to any particular application or device. Generally speaking, a flow of information for a number of objects may be too great for the repository 1410 to be practically useful in real-time, particularly given potential network delays. Rather, an auto-id node 1408 may be used to track such information, perhaps for some fixed period of time, that may be immediately useful to the auto-id node 1408.

The application manager 1406 and EPCIS layer 1404 have access to an Object Naming Service (ONS), which, similar to a Domain Name Service (DNS), is a look-up service that allows the application manager 1406 and EPCIS layer 1404 to find information about a product, based on the EPC code for that product. The ONS 1412 may have different levels of information, which may be classified, for example, by whether the information is stored locally or non-locally to the product.

An application level event (ALE) interface layer 1414 provides an interface to a device manager 1416 and the device controller 1418. More specifically, the ALE interface layer 1414 may be used to filter or aggregate information events, as received from the device manager 1416 and/or the device controller 1418. The device manager 1416 may be used to manage a status and/or configuration of the device controller 1418.

Also shown in FIG. 14, a reader protocol interface layer 1420 provides an interface for a device 1422. That is, it should be understood that different enterprises may employ different types of the device 1422, or other auto-id devices, and these devices and enterprises may make use of different reader protocols for communicating with the readers. The reader protocol interface 1420 is designed to enable communication with all readers within the system 1400.

It should be understood from FIG. 14 that the system 1400 may be used without the auto-id infrastructure 1304 of FIG. 13, and, conversely, the auto-id infrastructure 1304 of FIG. 13 may be used without other elements of FIG. 14. Thus, FIG. 14 illustrates that the auto-id infrastructure 1304 of FIG. 13 may be used with, but does not require the use of, the EPC network and standard.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method of processing auto-identification data comprising:
    storing a plurality of tag identifications;
    storing a plurality of locations, wherein each tag identification is associated with at least one location;
    storing information having a plurality of attributes, wherein each tag identification is associated with one or more of said attributes;
    generating a hierarchy based on at least one location or at least one attribute associated with the plurality of tag identifications; and displaying at least a portion of the information and at least a portion of the locations associated with each tag identification as nested shapes corresponding to the hierarchy.

2. The method of claim 1 wherein a plurality of the nested shapes in a first hierarchical level correspond to locations, and wherein at least one shape nested within at least one location corresponds to an object having an attached tag identification.

3. The method of claim 2 wherein the stored information includes a plurality of time stamps, and wherein said object is displayed in multiple locations in the first hierarchical level to illustrate movement of the object over time.

4. The method of claim 1 wherein a lowest hierarchical level of nested shapes includes a fill according to at least one of said attributes.

5. The method of claim 4 wherein the fill comprises different colors, patterns, or shades to distinguish between different values of the at least one attribute.

6. The method of claim 4 wherein the fill corresponds to asset utilization in a location.

7. The method of claim 1 further comprising filtering or aggregating the information.

8. The method of claim 1 further comprising storing a plurality of time stamps, and further comprising displaying a time slider to allow a user to view changes in location or attribute values at different times.

9. The method of claim 1 wherein the hierarchy comprises a plurality of locations.

10. The method of claim 1 wherein the hierarchy comprises a plurality of properties of a plurality of objects associated with the stored tag identifications.

11. A method of processing auto-identification data comprising:
receiving a plurality tag identifications;
receiving a plurality of location identifiers, wherein each tag identification is associated with at least one location identifier;
associating a location with information about an object using at least one of the tag identifications and associated at least one location identifier, wherein the information includes a plurality of attributes;
generating a hierarchy based on at least one location or at least one attribute; and
displaying at least a portion of the information and the location as nested shapes corresponding to the hierarchy.

12. The method of claim 11 wherein a nested shape is associated with a weight that determines the size of the nested shape.

13. The method of claim 12 wherein the weight is calculated based on at least one attribute associated with a tag identification.

14. The method of claim 11 wherein the hierarchy comprising a plurality of hierarchically related locations or hierarchically related attributes.

15. The method of claim 11 wherein a plurality of the nested shapes in a first hierarchical level correspond to locations, and wherein at least one shape nested within at least one location corresponds to an object having an attached tag identification.

16. A computer-readable medium containing instructions for controlling a computer system to perform a method of processing auto-identification data comprising:

storing a plurality of tag identifications;
storing a plurality of locations, wherein each tag identification is associated with at least one location;
storing information having a plurality of attributes, wherein each tag identification is associated with one or more of said attributes;
generating a hierarchy based on at least one location or at least one attribute associated with the plurality of tag identifications; and
displaying at least a portion of the information and at least a portion of the locations as a treemap.

17. The computer-readable medium of claim 16 wherein the treemap includes a plurality of the nested shapes in a first hierarchical level corresponding to locations, and wherein at least one shape nested within at least one location corresponds to an object having an attached tag identification.

18. The computer-readable medium of claim 16 further comprising storing a plurality of time stamps, and further comprising displaying a time slider to allow a user to view changes in location or attribute values at different times.

19. The computer-readable medium of claim 16 wherein the treemap includes a fill according to at least one of said attributes.

20. The computer-readable medium of claim 16 wherein the treemap includes a plurality of nested shapes having associated weights that determine the size of the nested shape.

21. An auto-id data processing system comprising:
a server for receiving a plurality of tag identifications and associated locations, wherein each tag identification is associated with at least one location;
a repository for storing the plurality of tag identifications and locations, wherein the repository further stores information having a plurality of attributes, and wherein each tag identification is associated with one or more of said attributes; and
a visualization software system coupled to the repository for accessing the tag identifications, locations, and information, the visualization software generating a hierarchy based on at least one location or at least one attribute associated with the plurality of tag identifications, and in accordance therewith, mapping said information in the repository to a display and displaying at least a portion of the information and at least a portion of the locations as a treemap.

22. The system of claim 21 wherein the treemap includes a plurality of the nested shapes in a first hierarchical level corresponding to locations, and wherein at least one shape nested within at least one location corresponds to an object having an attached tag identification.

23. The system of claim 21 wherein the visualization software includes an aggregator component, a filtering component, a time navigation component, or a tracking component.

24. The system of claim 21 wherein the visualization software includes a hierarchy component for building hierarchies based on the stored locations or information.

25. The system of claim 21 wherein the treemap includes a plurality of nested shapes having associated weights that determine the size of the nested shape.

* * * * *